United States Patent
Jordan

(10) Patent No.: US 6,237,044 B1
(45) Date of Patent: *May 22, 2001

(54) METHOD FOR OBJECT-ORIENTED PROGRAMMING USING DYNAMIC INTERFACES

(75) Inventor: David A Jordan, Madison, AL (US)

(73) Assignee: Intergraph Corporation, Huntsville, AL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/204,329

(22) Filed: Dec. 2, 1998

Related U.S. Application Data

(63) Continuation of application No. 08/552,812, filed on Nov. 3, 1995, now Pat. No. 6,016,392.

(51) Int. Cl.[7] .................................................... G06F 12/00
(52) U.S. Cl. .................................................... 709/316; 711/170
(58) Field of Search ................................ 709/328, 315, 709/316, 310; 711/171, 172, 170

(56) References Cited

U.S. PATENT DOCUMENTS

| 5,297,284 | 3/1994 | Jones et al. | 717/5 |
|---|---|---|---|
| 5,485,617 | 1/1996 | Stutz et al. | 709/315 |
| 5,581,760 | 12/1996 | Atkinson et al. | 717/2 |
| 5,608,909 | 3/1997 | Atkinson et al. | 717/3 |
| 5,682,536 | 10/1997 | Atkinson et al. | 717/3 |
| 5,692,184 | 11/1997 | Ardoin et al. | 707/103 R |
| 5,799,191 | 8/1998 | Moriyasu et al. | 709/204 |

OTHER PUBLICATIONS

Harrison, William et al., "Subject–Oriented Programming (A Critique of Pure Objects)", *ACM Sigplan Notices*, 28:10 pp. 411–428 (1993).
North, Ken, "Understanding OLE", *DBMS*, p. 10 (Jun. 1995).
Rogerson, Dale, "Calling COM Objects with Interface Wrappers", *Microsoft Developer Network Library*(CD ROM), pp. 1–8(Oct. 1995).
William, Sara et al., "The Component Object Model", *Dr. Dobb's Special Report*, 16:14–22 (Winter 1994/95).

*Primary Examiner*—John Courtenay, III
(74) *Attorney, Agent, or Firm*—Townsend and Townsend and Crew LLP

(57) ABSTRACT

An apparatus and method for allocating, linking and using blocks of memory to represent a data object in an object-oriented programming environment, particularly COM programming environments. The invention eliminates the conventional viable pointers, reference counters, controlling unknown pointers and other infrastructure overhead from the data objects. This information is instead allocated on a temporary basis only while an object is in use, in object and interface wrappers.

27 Claims, 7 Drawing Sheets

METHOD FOR OBJECT-ORIENTED PROGRAMMING USING DYNAMIC INTERFACES

This application is a continuation of and claims the benefit of U.S. patent application Ser. No. 08/552,812, filed Dec. 2, 1998, which is a continued patent application claiming priority from Nov. 3, 1995. The disclosures of all the priority applications are herein incorporated by reference for all purposes.

BACKGROUND OF THE INVENTION

The present invention relates to the allocation of memory in a computer at the application level. In particular, the invention relates to the allocation of memory in order to represent objects supported in an object-oriented programming environment.

The Component Object Module model (COM) is a language- and location-independent software specification. A general overview of COM and the closely related Object Linked and Embedding model (OLE) are presented below. COM and OLE are described fully in *Inside OLE*, by Kraig Brockschmidt, published by Microsoft Press (1995, 2d Edition), and in the references listed therein. The Brockschmidt reference is incorporated by reference. However, the Brockschmidt publication is not prior art.

As the C++ language is the object-oriented programming language currently enjoying the greatest acceptance among object-oriented programmers, this invention is described in C++. Of course, any language capable of to adhering to the CON standard can realize this invention and its benefits.

CON is a binary standard whose primary characteristic are objects and the interfaces associated with particular objects. An interface for an object is a set of functions for manipulating the object. A single object typically has several interfaces. C++ can very conveniently represent COM objects and interfaces (COM classes) with C++ classes.

The defining of a COM class proceeds in two steps: the first is the defining of the instance data of the object class. The second step is the defining of a class for each of the object class' interfaces.

Interface implementations are C++ classes derived from an abstract interface definition.

FIG. 1A schematically illustrates the layout of an example COM object 1A00, according to the conventional COM implementation. The object 1A00 contains some infrastructure, such as a pointer 1A10 to a controlling unknown interface and a reference counter 1A20. The object 1A00 also includes application data 1A30. Further, there is a pointer 1A40 for each interface which the object 1A00 supports, including the requisite IUnknown interface. (Each pointer 1A40 points directly to the vtable implementing the interface.) For each interface which the object 1A00 supports, the conventional implementation allocates a corresponding object 1A50 for the interface. This conventional and convenient implementation of COM interfaces takes advantage of C++'s virtual function capability.

However, the conventional implementation has a number of deficiencies. Objects such as sample object 1A00 are allocated and initialized at application start-up and remain in the memory of the application, despite the fact that the application may never use the object and despite the fact that, at any given time, the application will not use most objects. Therefore, the conventional implementation incurs the memory costs of one pointer 1A10 to a controlling interface, the reference counter 1A20, pointers 1A40 and one object 1A50 for each interface supported for an object.

Accordingly, a goal of this invention is the reduction of the memory costs of implementing COM objects.

Another goal of the invention is the simplification of the programming interface to COM and the elimination of a substantial amount of the repetitive infrastructure of conventional COM.

Yet another goal of the invention is to relieve individual designers of the need to devise complicated schemes to reduce memory consumption.

SUMMARY OF THE INVENTION

The invention is an apparatus and method for allocating, linking and using separate blocks of memory to represent the application data and the object-oriented programming model infrastructure of a data object. The invention includes referencing an object, allocating an object wrapper and then binding the object wrapper to the object.

The invention is particularly useful in the COM programming model. There, an object wrapper preferably includes the address of the object, the address of a description of the class of the object, the address of the controlling unknown of the object and the reference count for the object.

In a preferred embodiment, this first system maintains descriptions of each object class available in the system. The binding involves selecting from these multiple descriptions that description describing the object class of the object referenced and then linking the object wrapper and the selected description together.

In preferred embodiments, the object wrapper implements only one interface, the IUnknown interface, and is termed the IUnknown Wrapper.

When the object is queried for an interface (other than the IUnknown interface), the description of the object class is searched for the function table of the desired interface. If the interface exists, a second object wrapper, an Interface Wrapper, is allocated and initialized. The address of the Interface Wrapper is returned as the result of the query.

The Interface Wrapper is used to emulate invocation of a function from the function table of the desired interface. The call frame generated by the compiler for the Interface Wrapper function actually invoked is modified to replace a pointer to the Interface Wrapper with a pointer to the object. The function whose invocation is being emulated is then executed.

By eliminating the conventional vtable pointers, reference counters, controlling unknown pointers and other overhead from the data objects and instead temporarily allocating these structures in wrappers while an object is in use, the invention reduces the memory cost of modeling data objects as COM objects.

Also, the invention defines classes by explicitly stating their instance data and providing a set of independent interfaces. Accordingly, the invention simplifies the programming interface to COM and eliminates much of the infrastructure of conventional COM.

DESCRIPTION OF THE PREFERRED EMBODIMENT

The Dynamic Interfaces system of the invention is supported by a set of data structures which capture as data information that is conventionally captured as code in COM implementations. There are two main static data structures in the Dynamic Interfaces system: a Type Map with information about which classes are supported, and an Interface List with information about which interfaces are supported on each class. There are two types of object wrappers, the main dynamic data structure: IUnknown Wrappers and Interface Wrappers. A description of the static data structures follows immediately. A description of the dynamic data structures appears further below.

A Type Map is the root of the Dynamic Interfaces static data structures and is essentially a table of all of the classes involved in the Dynamic Interfaces system. This object is global.

Figure 3:
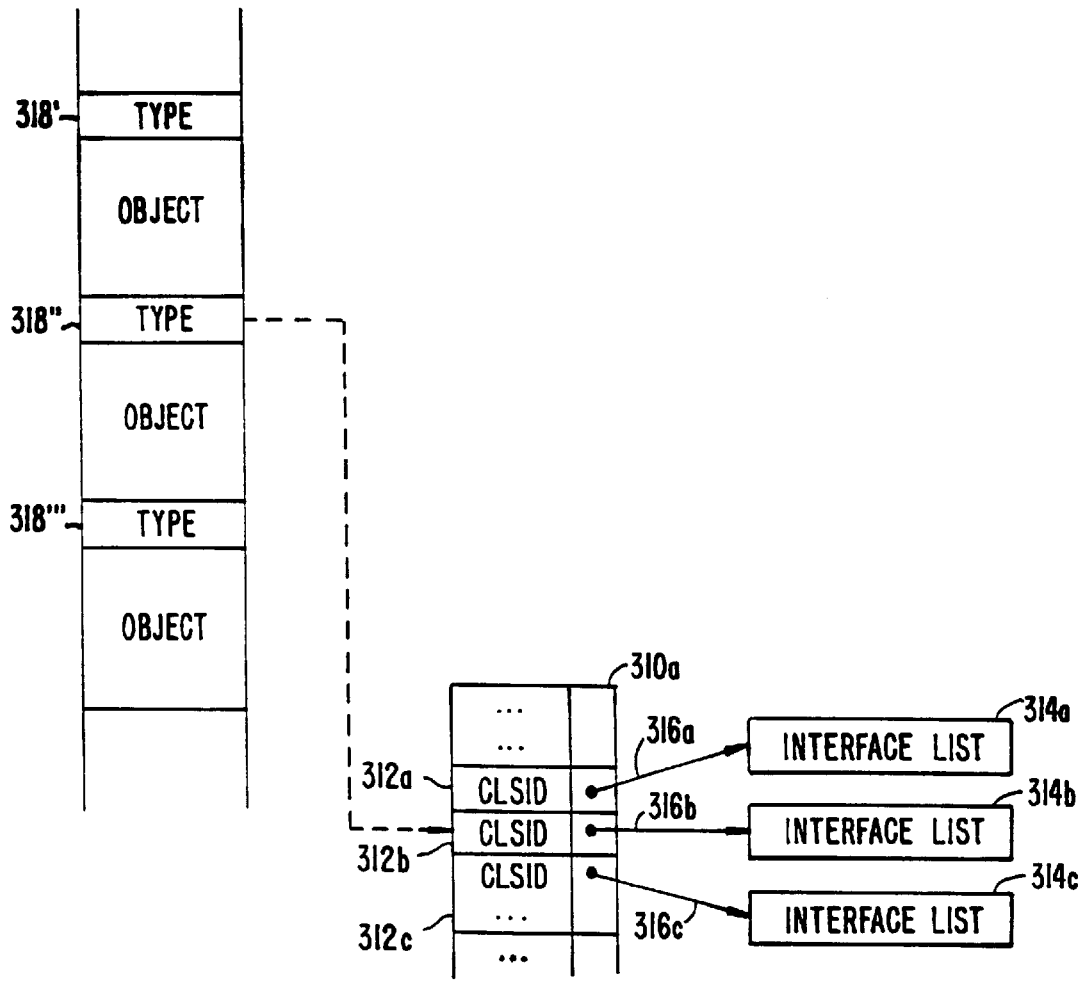
FIG. 3 illustrates the relationship of a type map to a data object.

Referring to FIG. 3, the Type Map is implemented as an array 310, indexed by integer identifiers discussed below. Each entry in the Type Map 310 is a Type Map Record 312 fully describing a particular class. A Type Map Record 312 for a class contains the following information:

a pointer 316 to an Interface List 314 specifying the interfaces that the class supports;

the CLSID of the class; and the integer-type identifier (not shown) of the class.

The system uses the CLSID to load the class' primary DLL (through CoGetClassobject). (In an alternative embodiment, where the class identifiers are larger than the two-byte integers envisioned here, the Type Map 310 is preferably a hash table.)

Figure 4:
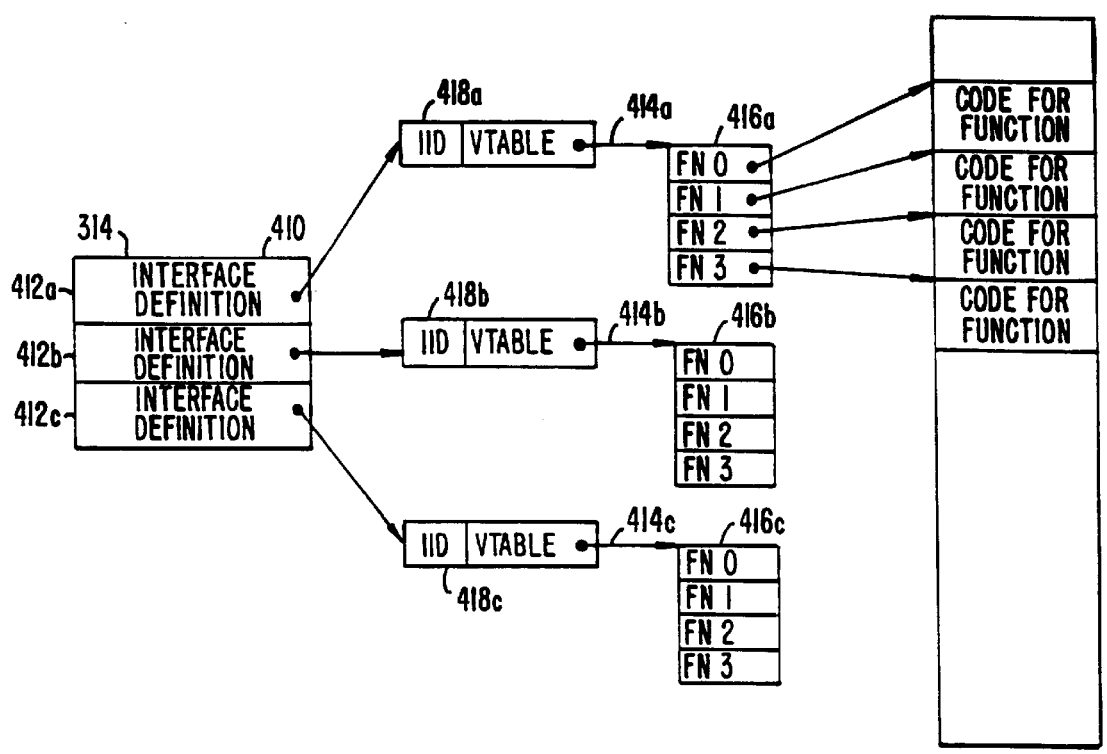
FIG. 4 is illustrates the contents of an Interface List.

Referring to FIG. 4, an Interface List 314 specifies the interfaces that a class supports. In a preferred embodiment, an Interface List 314 is an array 410 of pointers 412 to Interface Definition structures 414. An Interface Definition 414 defines the implementation of one interface and is a tuple pairing an interface ID (IID) with the vtable 416 that implements the interface.

The organization of a vtable 416 is part of the OLE specification. Accordingly, a vtable 416 is an array of pointers to the functions that implement the interface.

The creation of these static data structures results from the use of the various macros described below. Creation of most of the data structures occurs at compile time, but the system ties together some components at runtime. The runtime processing is initiated by the constructors and destructors of global variables declared with the macros. The loading into and unloading from memory of a DLL fires these functions.

Each vtable 416 is a static member variable of its interface's interface implementation class. Each interface implementation class includes the macro DECLARE DYN_MAP which declares a vtable 416. Macros BEGIN_DYN_MAP and END_DYN_MAP begin and terminate, respectively, the initialization of a vtable 416. Between the BEGIN_DYN_MAP and END_DYN_MAP macros, a DYN_MAP_ENTRY macro specifies one entry in this array 416. The vtables 416 are thus completely specified at compile time.

The template for using the macros is as follows:

| | |
|---|---|
| BEGIN_DYN_MAP | (<interface implementation class>) |
| DYN_MAP_ENTRY | (<interface implementation class>, <member function>) |
| DYN_MAP_ENTRY | (<interface implementation class>, <member function>) |
| DYN_MAP_ENTRY | (<interface implementation class>, <member function>) |
| END_DYN_MAP( ) | | where <interface implementation class> is the name of the class implementing the interface and there is a <member function> entry for each member function in the interface.

Similarly, a BEGIN_DYN_CLASS macro initializes an Interface List 314, and a series of DYN_INTERFACE_ENTRY macros specify the array 410 of pointers 412 and the Interface Definitions 418 that make up the list. An END_DYN_CLASS macro terminates the initialization list. Thus, an Interface List 314 is also completely specified at compile time.

The template for using these macros is as follows:

```
BEGIN_DYN_CLASS( <COM class> )
DYN_INTERFACE_ENTRY( <iid>, <interface implementation class> )
DYN_INTERFACE_ENTRY( <iid>, <interface implementation class> )
DYN_INTERFACE_ENTRY( <iid>, <interface implementation class> )
END_DYN_CLASS( )
```

Interface List objects have a constructor that accepts the address of the Interface Definition array 410 and the integer type of the class. This constructor counts the number of entries in the Interface Definition array 410 and stores that count in its instance data. The system updates the Type Map Record 312 identified by the integer-type number with this information and otherwise initializes the Type Map Record 312.

In one preferred embodiment, the Type Map 310 is a global variable containing a fixed-size, pre-allocated array. In another embodiment, the Type Map 310 is a reallocable array of pointers and the BEGIN_DYN_CLASS macros define and initialize the Type Map Record structures 312.

The runtime system is described below.

When an application accesses a Dynamic Interfaces object, the system assigns the object various wrappers that provide the COM behavior. There are two types of object wrappers: IUnknown Wrappers and Interface Wrappers. The invention maintains a cache of these object wrappers and can allocate one in a few instructions.

Figure 2A:
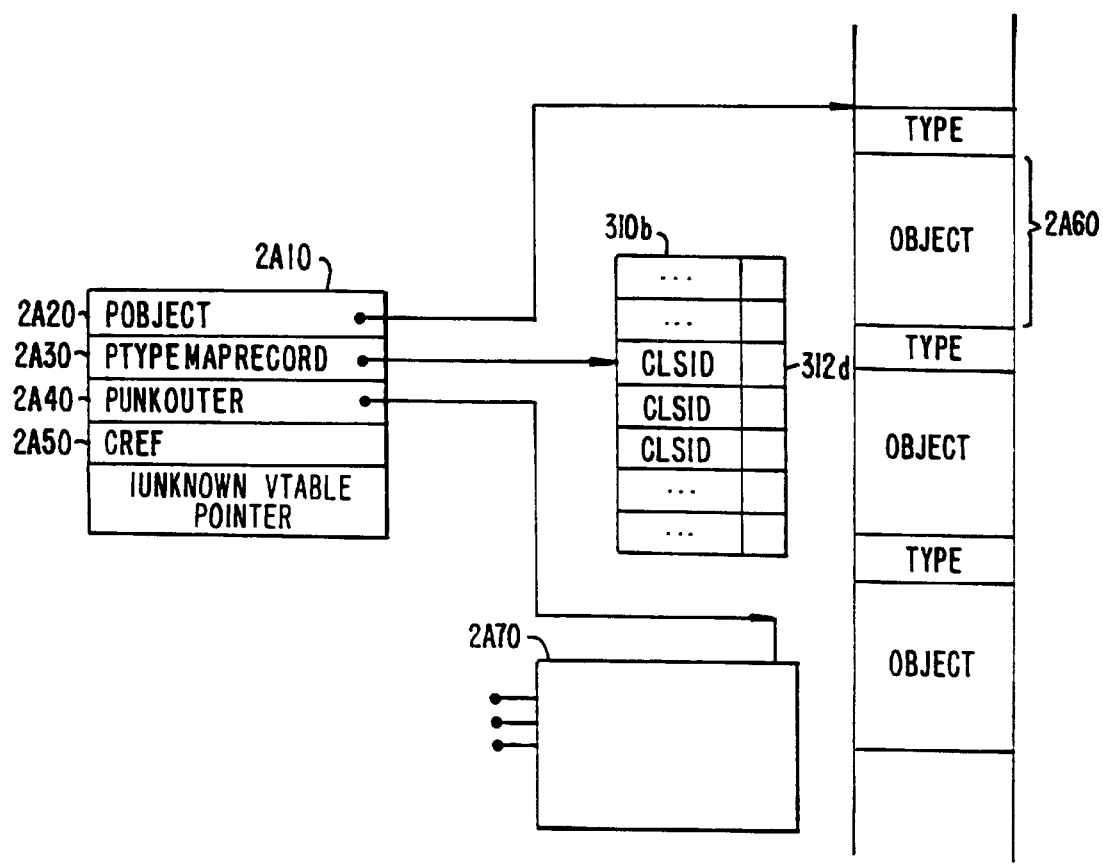
FIG. 2A is a schematic illustration of an object wrapper.
Figure 2B:
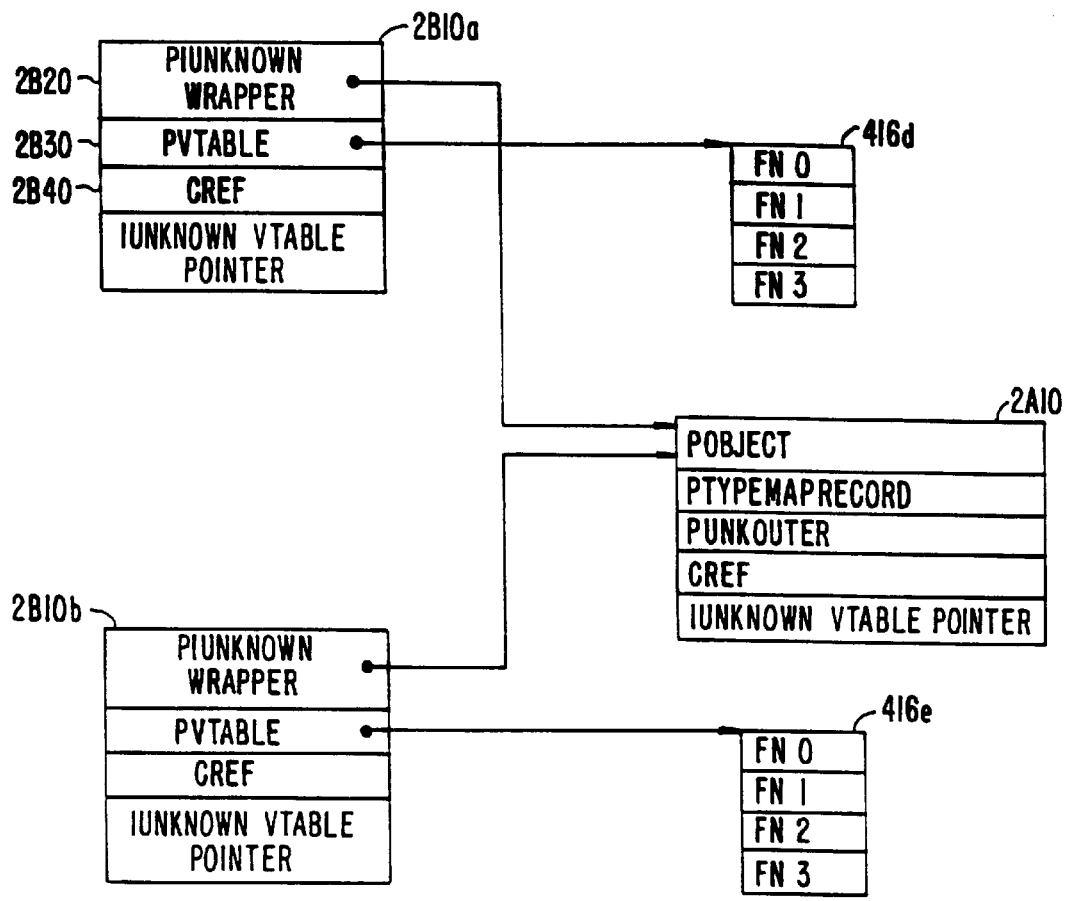
FIG. 2B is a schematic illustration of an interface wrapper.

FIGS. 2A and 2B illustrate an IUnknown Wrapper 2A10 and Interface Wrappers 2B10, respectively.

In a preferred embodiment, in addition to a pointer to a vtable including the ubiquitous IUnknown functions, an IUnknown Wrapper 2A10 includes the following instance data:

the address 2A20 of the object 2A60 being wrapped;

the address 2A30 of the Type Map Record 312 describing the object 2A60's class;

the address 2A40 of the object 2A60's controlling Unknown 2A70; and the IUnknown Wrapper 2A10's reference count 2A50.

An IUnknown Wrapper 2A10 is allocated when the object 2A60 is first referenced. When the system assigns the IUnknown Wrapper 2A10 to the object 2A60, the IUnknown Wrapper 2A10 goes through a binding process in which this instance data is initialized.

Binding is not expensive. The most substantial work involved is finding the appropriate Type Map Record 312. This is done by indexing the Type Map 310 with the object 2A60's integer-type ID for the Type Map Record 312.

There is ever only one IUnknown Wrapper 2A10 for an object 2A60 at any given time. The IUnknown Wrapper 2A10 remains bound to the object 2A60 until the reference count 2A50 of the object 2A60 goes to zero. The IUnknown Wrapper 2A10 is the IUnknown implementation for the class. The IUnknown Wrapper 2A10 is derived from IUnknown, and its address is returned when the application calls IUnknown::QueryInterface.

The IUnknown Wrapper 2A10 cannot implement any interface other than IUnknown. When a client requests an interface through QueryInterface, the system traverses the Interface List 314 and locates the vtable that implements the requested interface. The IUnknown Wrapper 2A10 then allocates an Interface Wrapper 2B10 and initializes it with this vtable 416. QueryInterface returns the address of the Interface Wrapper 2B10 as the interface implementation.

```
            (Each
DYN_INTERFACE_ENTRY(<iid>, <interface implementation class>)
line described above is equivalent to the code:
if (IsEqualIID( riid, iid ))
{
        *ppvObj = (LVVOID) <class name>;
}
``` which would be found in a conventional QueryInterface.)

In a preferred embodiment, in addition to a pointer to a vtable including the IUnknown functions and Interface Wrapper member functions described below, each Interface Wrapper 2B10 includes:

the address 2B20 of the corresponding IUnknown Wrapper 2A10;

the address 2B30 of the vtable 416 implementing the interface; and the reference count 2B40 of the Interface Wrapper 2B10.

The main function of the Interface Wrapper 2Blo is to masquerade as an implementation of whatever interface corresponds to the address 2B30 assigned by the system. Since the calling software does not know anything about Interface Wrappers, that software invokes member functions on the data object, thinking that it is invoking COM interface member functions (but actually invoking the Interface Wrapper member functions described below).

When an application invokes a COM member function, the compiler builds what is called a call frame, which includes the function's actual parameters, a pointer to the object on which to operate and the address to which to return. Typically, the compiler supports a number of calling conventions. However, the COM specification states that all interface calls must use a convention referred to as "standard call" ("_stdcall"). (This is what the conventional STDMETHOD macro does.) In this convention, all parameters are passed on the stack, with the object's this pointer being captured in an implicit first argument. The program then branches to the invoked function, which extracts its this pointer and parameters from the stack.

Figure 5:
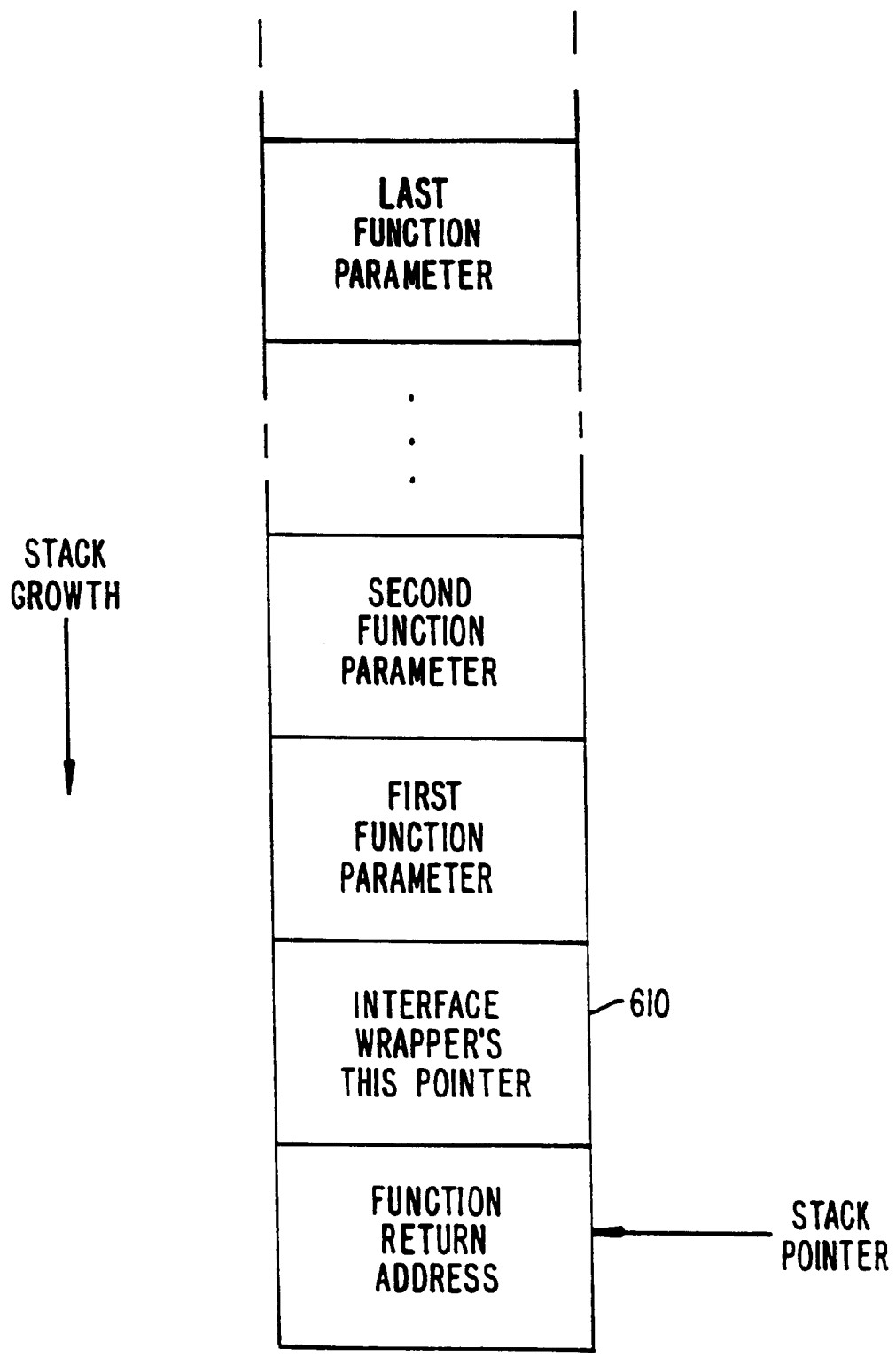
FIG. 5 is a schematic of an unmodified stack according to the standard call compiler convention.

When software calls a member function of an Interface Wrapper 2B10, the compiler gives the called function a valid call frame, formatted for the interface member function that the Interface Wrapper 2B10 is emulating. FIG. 5 is a schematic of such a call frame according to the standard call convention.

However, three issues present themselves: First, the call frame includes the this pointer 610 of the Interface Wrapper 2B10 instead of that of the data object. Second, one of the Interface Wrapper 2B10's member functions is executing instead of the required function of the interface implementation class. Third, Interface Wrapper member functions are written in assembly language, raising portability issues.

Figure 6:
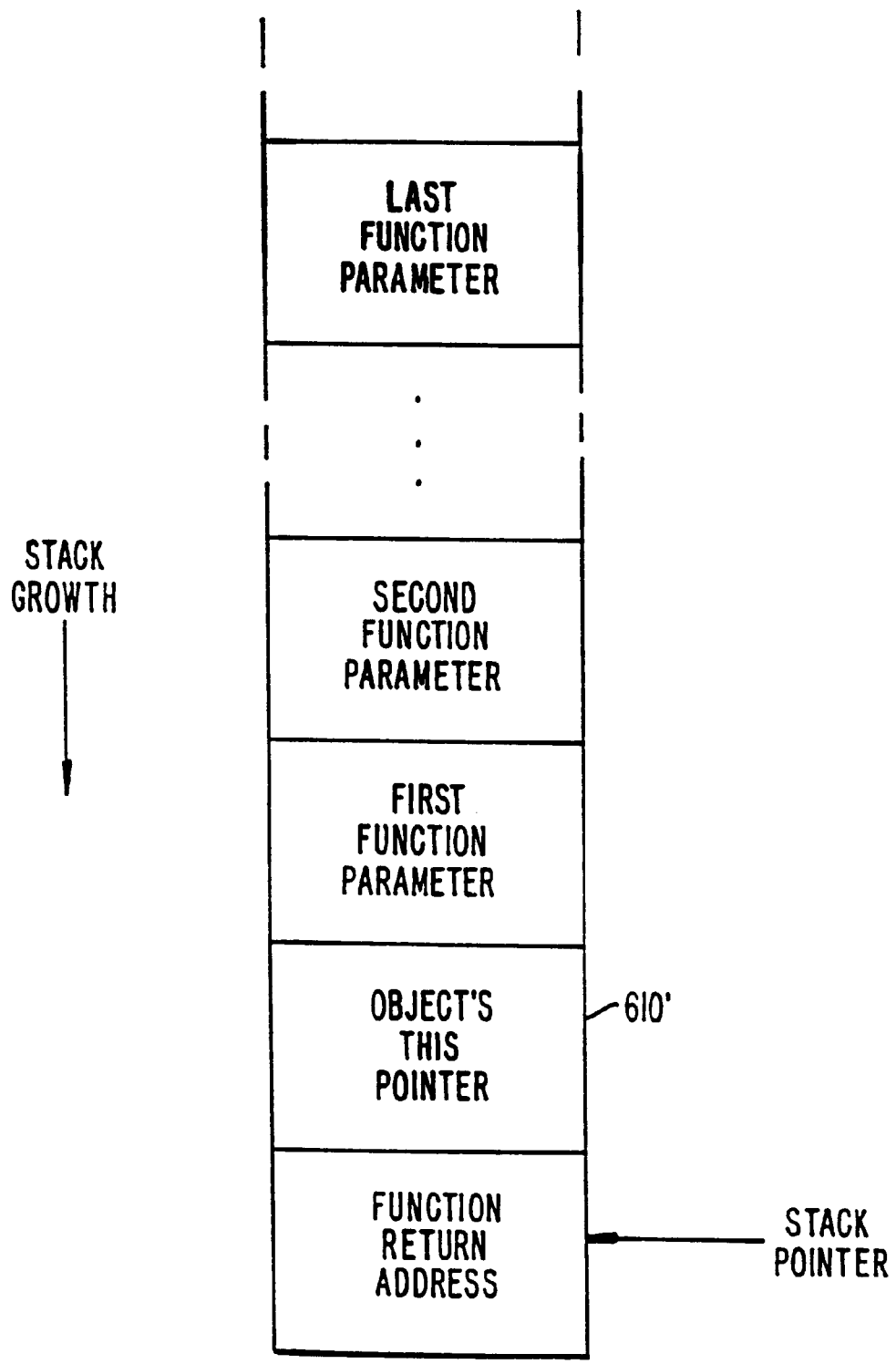
FIG. 6 is a schematic of a modified stack according to the standard call compiler convention.

As to the Interface Wrapper pointer in the call frame, the Interface Wrapper member function which is executing extracts the address 2A20 of the data object from its instance data (through its pointer 2B20 to the IUnknown Wrapper 2A10) and writes this value to the stack in the appropriate position. FIG. 6 is a sketch of a modified stack according to the standard call convention.

As to execution of the correct function, the Interface Wrapper member function which is executing extracts the address of the function that should be executing from its instance data (via vtable pointer 2B30) and branches to that address. The required member function then starts executing.

A more serious issue is the fact that the Interface Wrapper member functions are written in assembly language. In a preferred embodiment, however, the portability of only one function is at issue here. The actual Interface Wrapper member functions are implemented with a macro that records the function's number and branches to a central function. Assuming it is possible to find the position of the first function parameter on the stack, this central function is very simple and easily portable. This first parameter is easy to find if the compiler pushes the parameters onto the stack right-to-left but is not as readily locatable if the compiler pushes the parameters left-to-right. Conventional COM binary seems to mandate the right-to-left convention, though no explicit statement to this effect is known.

With left-to-right parameters, the system must maintain an indicator of the number of bytes in the call frame of each member function of each interface. These indicators would have to be accessible through the Interface Wrapper. As one of skill in the art will appreciate, this can be accomplished with a few more table-building macros.

(The class of an Interface Wrapper declares a vtable of a certain fixed size (preferably, 30). The system cannot handle interfaces with more member functions than this. In a preferred embodiment, an assertion will occur in debug mode if an attempt is made to register a vtable that exceeds this limit.) object and Interface Class Definition in a Preferred Embodiment According to the present invention, the designer defines COM classes ih substantially the same way as before: defining one class for the instance data and defining one class for each of the class' interfaces. However, the internals of a class and the mechanism of tying the classes together are quite different, as shown by a comparison of FIG. 1A with FIGS. 1B, 2A and 2B and as described herein.

The fundamental definition of a COM object class is its data C++ class. With Dynamic Interfaces, the designer defines a normal C++ class. When the object gets created, the mechanism that records the unique identifier for the object class must be initialized. For example, by means of an overload of the new operator, the unique identifier type can be stored as part of the data object, as illustrated by types 318 in FIG. 3. This mechanism can be reduced to a macro, herein termed, DECLARE_NEW_OVERLOAD, which takes the unique identifier as its one argument.

Preferably, th is unique identifier is an unsigned short (two-byte) integer. However, COM objects are already identified by a CLSID, and the CLSID of a class can be the argument to the macro. There is a tradeoff between programming convenience and execution speed, the main advantage of a short integer being performance. In any event, the Type Map is indexed in accordance with the selection of the CLSID or the short integer.

An example data class is as follows:

```
class Point
{
protected:
    int     m_nX;
    int     m_nY;
    int     m_nSymbology;
public:
    DECLARE_NEW_OVERLOAD( POINT_TYPE )
    Point( void );
};
```

The class is not derived from any other class and contains no virtual functions. While virtual functions are not prohibited, they are generally not necessary because COM functions as the "object polymorphism" machine.

Figure 1A:
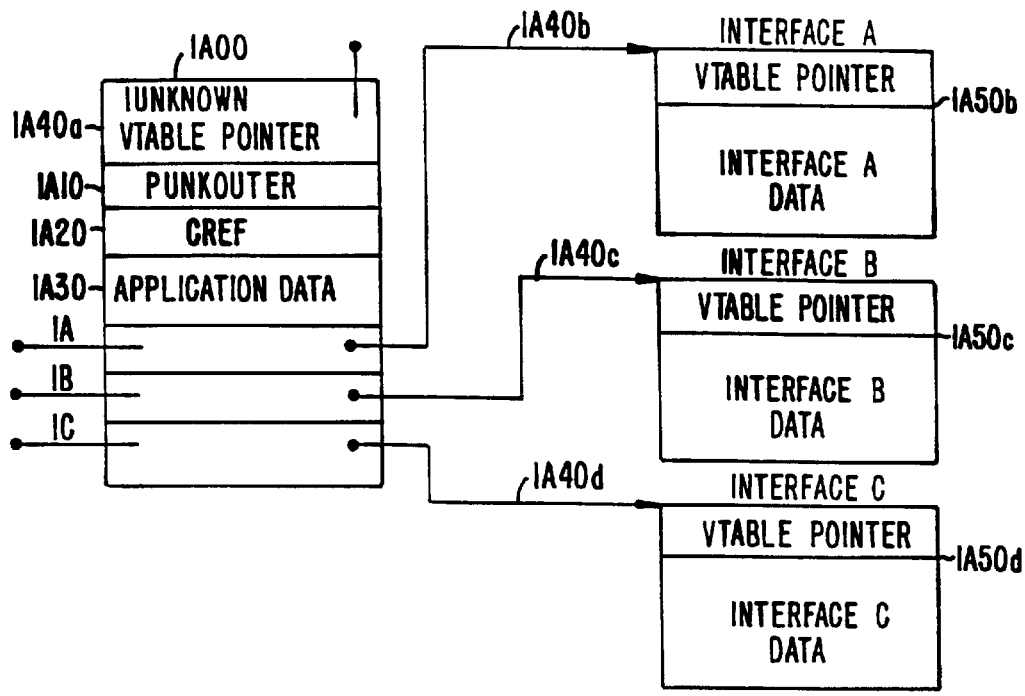
FIG. 1A is a schematic illustration of the memory consumption of a COM object at application start-up according to the prior art.
Figure 1B:
FIG. 1B is a schematic illustration of the memory consumption of a COM object at application start-up according to the present invention.

Also, the class has no COM-support member data such as a reference counter (e.g., m_cRef in FIG. 1A) or a pointer to a controlling interface (e.g., m_pUnkOuter in FIG. 1A). This data is not necessary here, as the system handles it as described above.

With regard to interface definitions, a Dynamic Interfaces class definition implements each COM interface implementation for a particular data class independently of the other interfaces on that class. The Dynamic Interfaces class is publicly derived from the data class upon which the interface is defined and includes a DECLARE_DYN_MAP macro and the interface member function declarations.

The following is a generic IGraphic interface on the Point object defined above:

```
DECLARE_INTERFACE_ (IGraphic, IUnknown)
{
    STDMETHOD(QueryInterface) (THIS_ REFIID riid,
                LPVOID FAR *ppvObj) PURE;
    STDMETHOD_(ULONG, AddRef) (THIS) PURE;
    STDMETHOD_(ULONG, Release) (THIS) PURE;
    STDMETHOD(Locate) (THIS_ int x, int y ) PURE;
    STDMETHOD(Display) (THIS_ HWND hWnd )PURE;
    STDMETHOD(PutGeometry) (THIS_ int x, int y ) PURE;
    STDMETHOD(GetGeometry) (THIS_ int *x, int *y )PURE;
};
        The implementation class would be
class PointIGraphic : public Point
{
    DECLARE_DYN_MAP(PointIGraphic)
    STDMETHODIMP Locate(int x, int y );
    STDMETHODIMP Display(HWND hWnd );
    STDMETHODIMP PutGeometry(int x, int y );
    STDMETHODIMP GetGeometry(int *x, int *y );
};
```

Notably, the implementation class does not provide the standard IUnknown functions. QueryInterface, AddRef and Release.

The vtable definition of the PointIGraphic class described above would be:

```
BEGIN_DYN_MAP( PointIGraphic )
DYN_MAP_ENTRY( PointIGraphic, Locate )
DYN_MAP_ENTRY( PointIGraphic, Display )
DYN_MAP_ENTRY( PointIGraphic, PutGeometry)
DYN_MAP_ENTRY( PointIGraphic, GetGeometry )
END_DYN_MAP( )
```

These entries appear in the same order in which they appear in the interface definition.

Finally, general support for a COM InProc Server is described. The general DLL infrastructure for Dynamic Interfaces DLLs is identical to that for conventional COM DLLs. DllGetClassobject is used to obtain class objects. DllCanUnloadNow determines whether the DLL can be unloaded from memory.

Dynamic Interfaces DLLs specify the interfaces that the class supports. They do so by placing the BEGIN_DYN_CLASS, DYN_INTERFACE_ENTRY and END_DYN_CLASS macros at file scope. For example, if the Point class defined above supports two interfaces, IGraphic and Isymbology, then its registration section would be

```
BEGIN_DYN_CLASS( POINT_TYPE )
DYN_INTERFACE_ENTRY( IID_IGraphic, PointIGraphic )
DYN_INTERFACE_ENTRY( IID_ISymbology, PointISymbology )
END_DYN_CLASS( )
```

Since Dynamic Interfaces objects require less memory than conventional COM objects, using Dynamic Interface objects enhances general system performance, particularly as page faulting is reduced. Nevertheless, the wrapping system does incur some overhead: Obtaining the first interface on an object requires the allocation of two wrappers, and subsequent interfaces each require one wrapper. The QueryInterface function itself should not be significantly slower than that of conventional COM. Once an interface pointer has been obtained, invoking a member function will take a small number of extra machine instructions (e.g., 10 on an 80×86 processor), typically negligible compared to the function's processing.

Dynamic Interface objects fully support the published COM semantics. They are constructed with class objects, they are manipulated through interfaces, they support IUnknown identity and they can aggregate objects and be aggregated by others.

Of course, the program text for such software as is herein disclosed can exist in its static form on a magnetic, optical or other disk, in ROM, in RAM, or in another data storage medium. That data storage medium may be integral to or insertable into a computer system.

What is claimed is:

1. In a computer-based application supporting a plurality of classes, a method for allocating memory for an object of a class from the plurality of classes, the method comprising:

maintaining a first data structure storing memory records for the plurality of classes;

determining a memory record for the class of the object from the first data structure;

dynamically allocating a first memory structure for the object without allocating memory for each of the interfaces supported by the class; and storing a location of the memory record for object class in the first memory structure.

2. The method of claim 1 further comprising ceasing to reference the object thereby dynamically freeing memory allocated for the first memory structure.

3. The method of claim 1 wherein dynamically allocating the first memory structure includes binding the first memory structure to the object.

4. The method of claim 1 wherein the memory record for the object stores a location of a second data structure, the second data structure storing information on interfaces supported by the class, the information including locations of functions implementing each of the interfaces.

5. The method of claim 4 wherein the interfaces supported by the class include a generic interface, and
wherein dynamically allocating the first memory structure comprises:
storing an address of the object in the first memory structure; and
storing an address of the generic interface in the first memory structure.

6. The method of claim 5 further comprising:
querying the object for a first interface supported by the class, thereby causing dynamic allocation of a second memory structure;
determining, from the second data structure, a memory location of functions implementing the first interface; and
storing the memory location of functions implementing the first interface in the second memory structure.

7. The method of claim 6 wherein querying the object for the first interface comprises returning an address of the second memory structure.

8. The method of claim 6 further comprising:
requesting invocation of a function supported by the first interface; and
using the memory location of functions stored in the second memory structure to invoke the function.

9. The method of 6 further comprising ceasing to reference the first interface thereby dynamically freeing memory allocated for the second memory structure.

10. A computer system configured to execute an application supporting a plurality of object classes, the computer system configured to allocate memory for an object of an object class from the plurality of object classes supported by the application, the computer system comprising:
a processor;
a memory coupled to the processor, the memory storing a first data structure comprising memory records for the plurality of object classes;
the processor configured to determine a memory record from the first data structure for the object class of the object, and to dynamically allocate a first memory structure for the object without allocating memory for each of the interfaces supported by the object class, the processor further configured to store a location of the memory record in the first memory structure.

11. The system of claim 10 wherein the processor is configured to dynamically free memory allocated for the first memory structure when the object is not referenced.

12. The system of claim 10 wherein the processor is configured to bind the first memory structure to the object.

13. The system of claim 10 wherein:
the memory is configured to store a second data structure storing information on interfaces supported by the object class, the information including locations of functions implementing each of the interfaces; and
the processor is configured to store a location of the second data structure in the memory record for the object.

14. The system of claim 13 wherein the interfaces supported by the object class include a generic interface, and wherein the first memory structure further stores an address of the object and an address of the generic interface.

15. The system of claim 14 wherein the processor is configured to dynamically allocate a second memory structure upon querying the object for a first interface supported by the object class, the processor further configured to determine a memory location of functions implementing the first interface from the second data structure, and to store the memory location of functions implementing the first interface in the second memory structure.

16. The system of claim 15 wherein the processor is configured to return an address of the second memory structure as a result of querying the object for the first interface.

17. The system of claim 15 wherein the processor, upon receiving a request to invoke a function supported by the first interface, is configured to invoke the function using the memory location of functions stored in the second memory structure.

18. The system of 15 wherein the processor is configured to dynamically free memory allocated for the second memory structure when the first interface is not referenced.

19. A computer program product for a computer, including a processor and memory, for directing the processor to allocate memory for an object in an application supporting a plurality of object classes including an object class of the object, the computer program product comprising:
code that directs the processor to maintain in the memory a first data structure storing memory records for the plurality of classes;
code that directs the processor to determine a memory record for the object class from the first data structure;
code that directs the processor to dynamically allocate a first memory structure for the object without allocating memory for each of the interfaces supported by the object class;
code that directs the processor to store a location of the memory record for the object class in the first memory structure; and
a computer-readable storage medium that stores the codes.

20. The computer program product of claim 19 further comprising code that directs the processor to dynamically free memory allocated for the first memory structure when the object is not referenced.

21. The computer program product of claim 19 wherein the code that directs the processor to dynamically allocate the first memory structure includes code that directs the processor to bind the first memory structure to the object.

22. The computer program product of claim 19 further comprising code that directs the processor to store a location of a second data structure in the memory record for the object, the second data structure storing information on interfaces supported by the object class, the information including locations of functions implementing each of the interfaces.

23. The computer program product of claim 22 wherein the interfaces supported by the object class include a generic interface and,
wherein the code that directs the processor to dynamically allocate the first memory structure comprises:

code that directs the processor to store an address of the object in the first memory structure; and code that directs the processor to store an address of the generic interface in the first memory structure.

24. The computer program product of claim 23 further comprising:

code that directs the processor to cause dynamic allocation of a second memory structure when the object is queried for a first interface supported by the object class;

code that directs the processor to determine, from the second data structure, a memory location of functions implementing the first interface; and code that directs the processor to store the memory location of functions implementing the first interface in the second memory structure.

25. The computer program product of claim 24 wherein the code that directs the processor to cause dynamic allocation of the second memory structure when the object is queried for the first interface further comprises code that directs the processor to return an address of the second memory structure.

26. The computer program product of claim 24 further comprising:

code that directs the processor to request invocation of a function supported by the first interface; and code that directs the processor to invoke the function using the memory location of functions stored in the second memory structure.

27. The computer program product of 24 further comprising code that directs the processor to dynamically free memory allocated for the second memory structure when all references to the first interface have ceased.

* * * * *